United States Patent [19]

Nishimoto et al.

[11] Patent Number: 5,315,466
[45] Date of Patent: May 24, 1994

[54] MAGNETIC DISK UNIT HAVING REDUCED PROFILE AND/OR FASTER SEEK SPEED

[75] Inventors: Hideki Nishimoto; Wataru Niibe, both of Matumoto, Japan

[73] Assignee: Fuji Electric Co., Ltd., Japan

[21] Appl. No.: 846,343

[22] Filed: Mar. 5, 1992

[30] Foreign Application Priority Data

Mar. 6, 1991 [JP] Japan .................................. 3-38821
Dec. 10, 1991 [JP] Japan ................................ 3-324887

[51] Int. Cl.⁵ ............................................. G11B 5/55
[52] U.S. Cl. ................................................. 360/106
[58] Field of Search ............................. 360/106, 137

[56] References Cited

U.S. PATENT DOCUMENTS 5,193,037 3/1993 Pace ..................................... 360/106
5,195,002 3/1993 Sakurai ............................. 360/99.08

*Primary Examiner*—John H. Wolff
*Assistant Examiner*—Paul J. Ditmyer
*Attorney, Agent, or Firm*—Parkhurst, Wendel & Rossi

[57] ABSTRACT

The present invention provides a disc storage unit that utilizes a voice coil motor to move an access arm. The voice coil motor includes a coil disposed on the side of the access arm parallel with the case bodies of the disc storage unit, a pair of upper and lower yokes, with the coil located therebetween, mounted in parallel to the case bodies, and magnets disposed on at least one of the upper and lower yokes with a cross flux to the coil. At least one of the upper or lower yokes extends through a through-hole provided in at least one of the case bodies. The space gained by the through-hole can be used to reduce the profile of the disc storage unit or permit larger magnets, yokes, etc. to be used in the voice coil motor. The larger magnets, yokes, etc., improve the output of the voice coil motor and speed up the seek time of the disc storage unit. Therefore, the advantages of a low-profile and a high speed seek time can be obtained, respectively.

14 Claims, 2 Drawing Sheets ic disk units that include a magnetic head for reading and writing information on a magnetic disk. More specifically, the invention relates to improvements in a voice coil motor that is used to rotate the magnetic head of the magnetic disk unit

MAGNETIC DISK UNIT HAVING REDUCED PROFILE AND/OR FASTER SEEK SPEED

BACKGROUND OF THE INVENTION

The present invention relates in general to magnetic disk units that include a magnetic head for reading and writing information on a magnetic disk. More specifically, the invention relates to improvements in a voice coil motor that is used to rotate the magnetic head of the magnetic disk unit A sectional view of a conventional voice coil motor is illustrated in FIG. 8. The voice coil motor includes a coil disposed on the side of a magnetic head (not shown) parallel to a pair of case bodies 2a, 2b. A pair of upper and lower yokes 4a, 4b, with the coil 3 located between them, are mounted parallel to the case bodies 2a, 2b. Post yokes 5 are provided to form magnetic paths through the upper yoke 4a and the lower yoke 4b and magnets 7a, 7b, 7c, 7d with a cross flux 6 for the coil 3. The magnetic head can be rotated according to Fleming's rule when the coil 3 is activated.

In recent years, there has been a demand to speed up the seek time required to rotate the magnetic head. The seek time could be increased by increasing the thickness of the magnets 7a, 7b, 7c, 7d to obtain a higher flux density in order to improve the output of the voice coil motor. In addition, the thickness of the post yokes 5 could be increased to reduce the degree of magnetic saturation. Increasing the thickness of the magnets or the yokes, however, runs contrary to efforts to maintain a low profile for the magnetic disk unit which is also desirable.

It is therefore an object of the present invention to provide a magnetic disk unit having a faster seek time to rotate the magnetic head while maintaining a low profile in order to achieve an overall thinner magnetic disk unit.

SUMMARY OF THE INVENTION

The present invention provides a magnetic disk unit having a high speed seek time and a low profile. The magnetic disk unit according to a first embodiment of the invention comprises a spindle motor for driving a magnetic disk, an access arm with a magnetic head that is used to read and write information to and from the magnetic disk, a voice coil motor to rotate the access arm, and a pair of case bodies to house and enclose the above mentioned components. The voice coil motor comprises a coil disposed on the side of the access arm parallel to the case bodies, a pair of upper and lower yokes, with the coil located therebetween, mounted parallel to the case bodies, and magnets disposed on one of the upper and lower yokes with a cross flux to the coil. At least one of the upper and lower yokes extends through through-holes which are provided in the case bodies.

A magnetic disk unit according to further embodiment of the invention is the magnetic disk unit according to the first embodiment, wherein the other of the upper and lower yokes are secured to the inner periphery of the other of the case bodies, and a space disposed between one of the upper and the lower yokes and the through-hole is sealed with a sheet plate.

A magnetic disk unit according to a further embodiment of the invention is the magnetic disk unit of the first embodiment, wherein flanges with crank-shaped sections are formed inside the inner peripheries of the through-holes, and the outside portions of the flanges make contact with an inner periphery of at least one of the upper and lower yokes.

A magnetic disk unit according to a further embodiment of the invention is the magnetic disk unit of the first embodiment, wherein flanges with crank-shaped sections are formed inside the inner peripheries of the through-holes and the outside portions of the flanges make contact with an inner periphery of at least one of the upper and lower yokes, while the space disposed between the other upper and lower yoke and the other through-hole is sealed with a sheet plate.

In a magnetic disk unit according to a further embodiment of the invention, the above-mentioned sheet plate is made of a magnetic material.

A magnetic disk unit according to a still further embodiment of the invention comprises a magnetic disk driven by a spindle motor, an access arm with a magnetic read/write head for handling the reading and writing of information to the magnetic disk, a voice coil motor for rotating the access arm, and a pair of case bodies for housing and enclosing the above-mentioned components. The voice coil motor comprises a coil disposed on the side of the access arm parallel to the case bodies, a pair of upper and lower yokes putting, with the coil located therebetween, mounted in parallel with the case bodies, and magnets disposed on one of the upper yokes and the lower yokes with a cross flux to the coil, and at least one of the upper and lower yokes integrally mounted to the case bodies which are made of a magnetic material.

According to the first embodiment of the present invention, the thickness of the case bodies can be reduced by a case body thickness since at least one of the upper and lower yokes extends through one of the through-holes provided in the case bodies. The space gained by reducing the thickness of the case bodies can be used to reduce the overall profile of the magnetic disk unit or to permit larger magnets and yokes to be employed to improve the output of the voice coil motor in order to speed up the seek time of the magnetic disk unit.

In further embodiments, the space disposed between one of the upper and the lower yokes and the through-hole is sealed with a sheet plate, thereby permit the magnetic disk unit can be reliably sealed; at least one of the upper and lower yokes is secured to the outside portions of the flanges with crank-shaped sections; at least one of the upper and lower yokes is secured to the outside of the flange with a crank-shaped section, while a space disposed between the other of the upper and lower yokes and the through-hole is sealed with a sheet plate; and the sheet plate is made of magnetic material to reduce leakage flux and rectify the flux flow.

In the magnetic disk unit according to the embodiment in which the case bodies are integrally mounted with one of the upper and lower yokes and made of a magnetic material, the case bodies can be simply constructed so that they can act as both a case body and a yoke. Furthermore, as in the case of the first embodiment, the magnetic disk unit can have a lower profile and/or larger magnets, yokes, etc. The larger magnets or yokes can improve the output of the voice coil motor in order to speed up the seek time of the magnetic disk unit. Therefore, a low-profile and shorter seek time can be provided, respectively.

BRIEF DESCRIPTION OF THE DRAWINGS

With the above as background, reference should now be made to the following detailed description of the preferred embodiments and the accompanying drawings, in which similar structures are denoted by the same reference numeral, wherein.

DETAILED DESCRIPTION OF THE PREFERRED EMBODIMENTS

The invention will be described with specific reference to a magnetic disk unit that includes an internal magnetic storage disk. It will be understood, however, that the invention is applicable to any type of information storage disk unit, whether the storage disk is integral with or removable from the disk unit, that utilizes an access arm to which a read and/or write head is attached.

Figure 1:
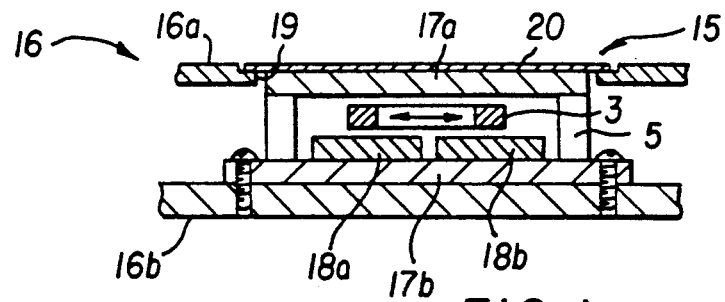
FIG. 1 is a section view of a voice coil motor in accordance with a first embodiment of the invention.
Figure 2:
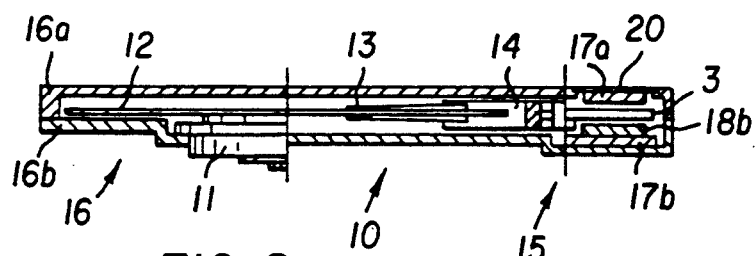
FIG. 2 is a sectional view of the magnetic disk unit illustrated shown in FIG. 3 taken along line A—A.
Figure 3:
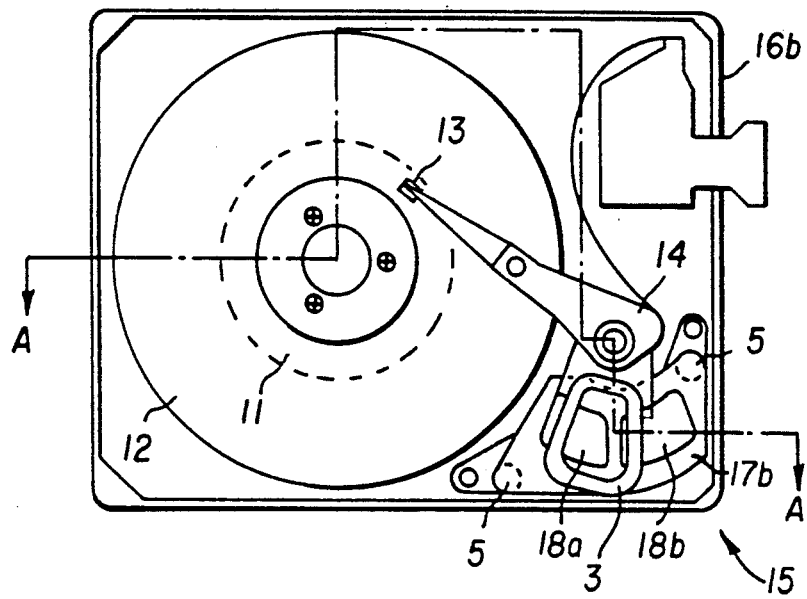
FIG. 3 is a perspective plane view of a magnetic disk unit incorporating the voice coil motor of the invention.
Figure 8:
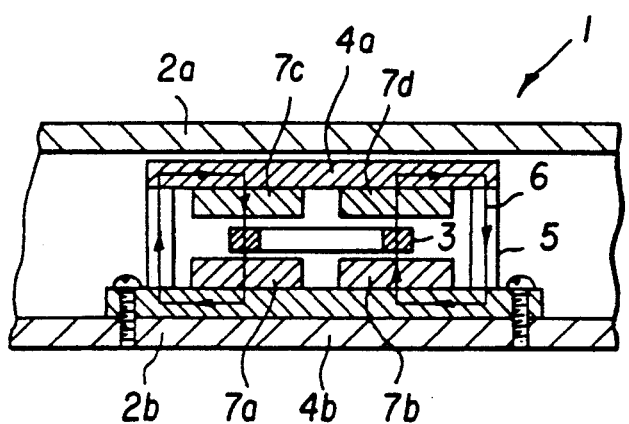
FIG. 8 is a sectional view of a conventional voice coil motor.

Referring now to FIGS. 1-3, a magnetic disk unit is shown that includes a magnetic disk 12 driven by a spindle motor, an access arm 14 with a magnetic read/write head 13 for handling the reading and writing of information to and from the magnetic disk, a voice coil motor 15 for rotating the access arm, and a pair of case bodies 16, namely a plain cover 16a and a substrate 16b, for housing the above-mentioned components. The voice coil motor 15 includes a coil 3 disposed on the side of the access arm 14 in parallel with a pair of case bodies 16. An upper yoke 17a and a lower yoke 17b, with the coil 3 located between them, are mounted parallel to the case bodies 16 and post yokes 5 are provided to form magnetic paths for the upper and lower yokes. Magnets 18a, 18b are preferably located on the lower yoke 17b and are in the magnetic paths with a cross flux to the coil 3. Also, magnets may be employed on the upper yoke 17a as in the case of the prior art illustrated in FIG. 8. The upper yoke 17a extends through a through-hole 19 which is provided in the cover 16a. Consequently, a space disposed between the yoke 17a the through-hole 19 is sealed with a sheet plate 20. The lower yoke 17b is secured to the inner periphery of the substrate 16b. The sheet plate 20 is preferably made of magnetic material, i.e. a material capable of providing magnetic shielding to reduce leakage flux, although other materials could be used.

According to the above described construction, the thickness of the case bodies can be reduced by the thickness of the cover 16a since the upper yoke 17a extends through a through-hole 19 provided in the cover 16a. The reduced thickness of the case bodies results in a thinner magnetic disk unit or the provision for enough space for larger magnets, yokes, etc. The larger magnets or yokes improve the output of the voice coil motor and speed up the seek time of the magnetic disk unit. Therefore, a lower profile and shorter seek time can be provided, respectively. A space disposed between one of the upper and lower yokes and the through holes 19 is preferably sealed with a sheet plate 20. Consequently, the magnetic disk unit is reliably sealed. Furthermore, the sheet plate 20, which is made of magnetic material, reduces leakage flux and rectifies the flux flow.

Figure 4:
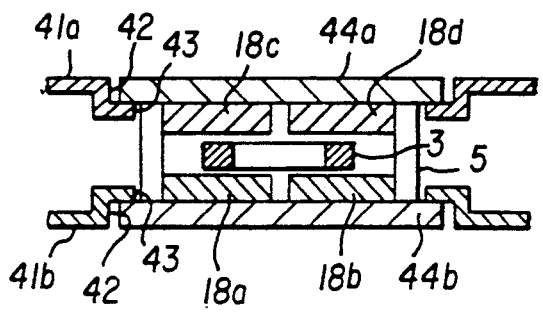
FIG. 4 is a sectional view of a voice coil motor in accordance with a second embodiment of the invention.

According to the second embodiment of the invention shown in FIG. 4, flanges 43 with crank-shaped sections are formed inside the inner peripheries of the through-holes 42. The through-holes 42 are defined by a cover 41a and substrate 41b serving as case bodies. The outside portions of the flanges make contact with the inside portions of the upper yoke 44a and the lower yoke 44b. The flanges may be bonded to the upper and lower yokes or may be pressed into the inner peripheries of the through-holes 42 or the flanges 43. In this embodiment, the upper yoke 44a is also provided with magnets 18c, 18d.

Figure 5:
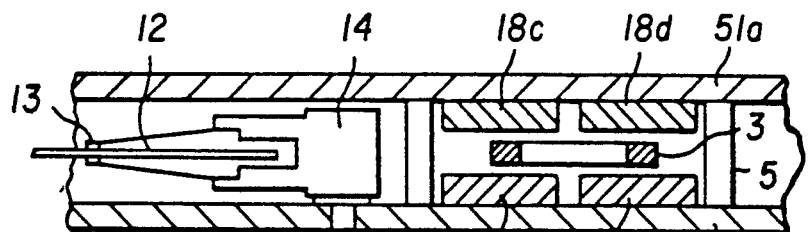
FIG. 5 is a sectional view of a voice coil motor in accordance with a third embodiment of the invention.

According to the third embodiment illustrated in FIG. 5, the upper yoke 51a and the lower yoke 51b are formed integral, or integrally mounted, with the case bodies which are made of magnetic material. Thus, the case bodies can be simply constructed and act both as case bodies and yokes. Furthermore, as in the first embodiment or the second embodiment, a lower profile is provided or larger sized magnets, yokes, etc. can be used to improve the output of the voice coil motor and speed up the seek time of the magnetic disk. Therefore, a low profile and shorter seek time can be respectively provided. Also, a magnetic circuit may be designed with or without post yokes.

Figure 6:
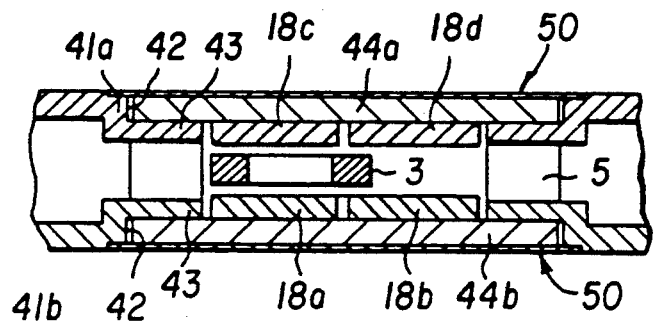
FIG. 6 is a sectional view of a voice coil motor in accordance with a fourth embodiment of the invention.

According to the fourth embodiment shown in FIG. 6, as in the case of the second embodiment shown in FIG. 4, flanges 43 with crank-shaped sections are formed inside the inner peripheries of the through-holes 42. The through-holes 42 are defined by a cover 41a and a substrate 41b serving as case bodies. The outside portions of the flanges make contact with the inside portions of the upper yoke 44a and the lower yoke 44b. The magnetic disk unit of the fourth embodiment differs from that of the second embodiment in that the space disposed between the upper yoke 44a and the through-hole 42 is sealed with a sheet plate 50 and post yokes 5 are disposed between the flanges 43.

Figure 7:
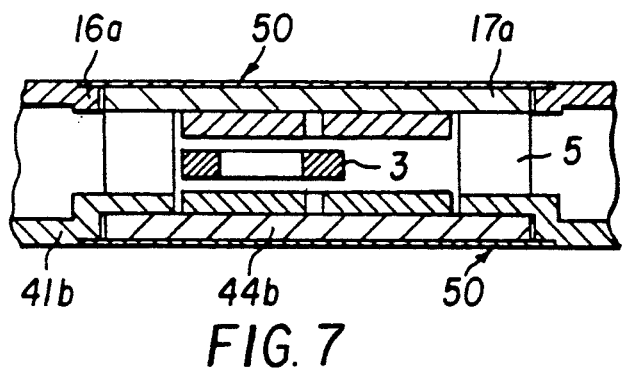
FIG. 7 is a sectional view of a voice coil motor in accordance with a fifth embodiment of the invention.

According to the fifth embodiment illustrated in FIG. 7, the lower structure of the magnetic disk unit of the fourth embodiment is combined with the upper structure of the magnetic disk unit of the first embodiment, and the upper and lower structures are sealed with sheet plates that are made of a magnetic material.

In the magnetic disk unit of the present invention, at least one of the upper and lower yokes extends through through-holes provided in at least one of the case bodies of the magnetic disk unit and/or at least one of the upper and lower yokes is mounted together or formed integrally with one of the case bodies which are made of a magnetic material. Consequently, the thickness of the magnetic disk unit can be reduced by the thickness of the case body. The reduced thickness of the case bodies results in a low-profile magnetic disk unit or larger magnets, yokes, etc. used in the magnetic disk unit. The larger magnets or yokes improve the output of the voice coil motor and speed up the seek time of the magnetic disk unit. Therefore, the advantages provided of a low profile and high speed seek time can be obtained. If the magnetic disk unit has through-holes, a space disposed between one of the upper and lower yokes and the through-hole is sealed with a sheet plate. Accordingly, the magnetic disk unit can be reliable sealed or at least one of the upper and lower yokes can be secured to the outside portions of the flanges with crank-shaped sections. Thus, it is possible to obtain a reliably sealed and rigid magnetic disk unit. Furthermore, if the sheet plate is made of a magnetic material, it will be possible to reduce the leakage flux and rectify the flux flow.

The invention has been described with reference to certain preferred embodiment thereof. It will be understood, however, that modification and variations are possible with the scope of the appended claims. For example, other combinations of the various embodiments for the upper and lower structures other than the combination illustrated in FIG. 7 are possible. Other physical structures that provide the same function as those incorporated in the preferred embodiments may also be employed. Finally, the invention is not limited to magnetic disk drive units, but can be employed in any type of disk storage unit that employs an access arm having a read and/or write head located thereon.

What is claimed is:

1. A magnetic disk unit comprising: an access arm; a voice coil motor for rotating the access arm; and a pair of case bodies for housing and enclosing the access arm and voice coil motor; wherein the voice coil motor comprises a coil disposed on the side of the access arm substantially parallel with the case bodies, an upper yoke and a lower yoke, with the coil located therebetween, mounted substantially parallel with the case bodies, and magnets disposed on at least one of the upper and lower yokes and having a cross flux to the coil; and wherein at least one of the upper and lower yokes extends through a through-hole provided in at least one of the case bodies.

2. A magnetic disk unit as claimed in claim 1, further comprising a storage disk drive motor.

3. A magnetic disk unit as claimed in claim 2, further comprising a storage disk coupled to the storage disk drive motor.

4. A magnetic disk unit as claimed in claim 3, wherein the storage disk is a magnetic storage disk and the access arm includes a magnetic read/write head for reading and writing information to and from the magnetic storage disk.

5. A magnetic disk unit as claimed in claim 1, wherein at least one of the upper and lower yokes is secured to the inner periphery of at least one of the case bodies.

6. A magnetic disk unit as claimed in claim 1, wherein a space located between through-hole and the yoke extending therethrough is sealed with a sheet plate.

7. A magnetic disk unit as claimed in claim 6, wherein the sheet plate is made of a magnetic material.

8. A magnetic disk unit as claimed in claim 1, wherein flanges with crank-shaped sections are formed inside the inner peripheries of the through-hole and the outside portions of the flanges make contact with the inner periphery of the yoke extending through the through-hole.

9. A magnetic disk unit as claimed in claim 1, a space disposed between the through-hole and the yoke extending therethrough is covered with a sheet plate.

10. A magnetic disk unit as claimed in claim 9, wherein the sheet plate is made of a magnetic material.

11. A magnetic disk unit comprising: an access arm; a voice coil motor for rotating the access arm; an upper and a lower case body, each comprising a magnetic material, for housing the access arm and the voice coil motor; wherein the voice coil motor includes a coil disposed on a side of the access arm substantially parallel to the case bodies, a pair of post yokes, with the coil located therebetween, mounted substantially perpendicular to the case bodies, and magnets located on at least one of the upper and the lower case bodies and having a cross flux to the coil; and wherein at least one of the upper and the lower case bodies acts as a yoke structure for the voice coil motor by providing a magnetic flux path.

12. A magnetic disk unit as claimed in claim 11, further comprising a storage disk drive motor.

13. A magnetic disk unit as claimed in claim 12, further comprising a storage disk coupled to the storage disk drive motor.

14. A magnetic disk unit as claimed in claim 13, wherein the storage disk is a magnetic storage disk and the access arm includes a magnetic read/write head for reading and writing information to and from the magnetic storage disk.

* * * * *